Figure 1:
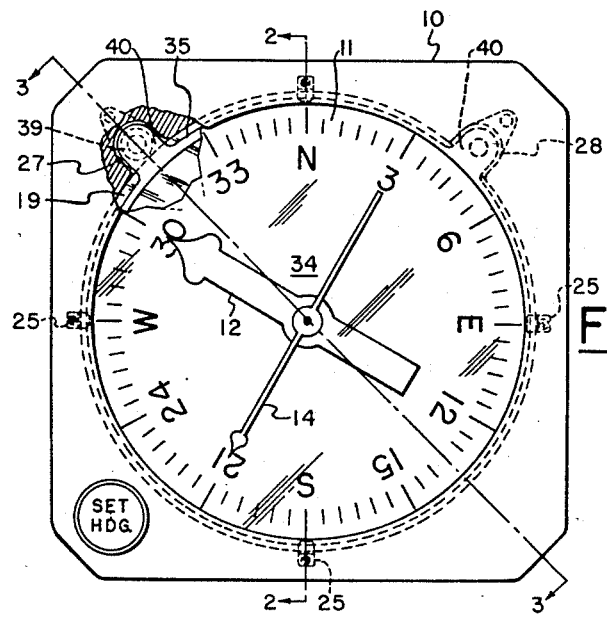

April 10, 1962 G. R. ANDERSON ET AL 3,029,334
ILLUMINATING MEANS FOR DIRECT READING INSTRUMENTS
Filed Dec. 26, 1958 2 Sheets-Sheet 1

INVENTORS
GORDON R. ANDERSON
JOHN D. McCALLION
BY
Arthur H. Serrell
ATTORNEY

April 10, 1962 G. R. ANDERSON ET AL 3,029,334
ILLUMINATING MEANS FOR DIRECT READING INSTRUMENTS
Filed Dec. 26, 1958 2 Sheets-Sheet 2

INVENTORS
GORDON R. ANDERSON
JOHN D. MC CALLION
BY
*Arthur H. Serrell*
ATTORNEY

United States Patent Office 3,029,334
Patented Apr. 10, 1962

3,029,334
ILLUMINATING MEANS FOR DIRECT
READING INSTRUMENTS
Gordon R. Anderson, Bethpage, and John D. McCallion, Great Neck, N.Y., assignors to Sperry Rand Corporation, Great Neck, N.Y., a corporation of Delaware
Filed Dec. 26, 1958, Ser. No. 783,049
2 Claims. (Cl. 240—1)

This invention relates to an improvement in the lighting technique for direct reading instruments known in the art as wedge type lighting. Illumination of this character in accordance with the teaching in the U.S. Patent No. 2,761,056 of August 28, 1956, to John Lazo is provided for the indicating face or dial and movable or pointer components of such instruments to enable the relative position of the components to be viewed by an observer under conditions that eliminate glare.

In accordance with the present invention, a plano-concave light conducting element or prism is utilized to provide a modified primary and reverse wedge type of illumination for the indicating or reading member of the instrument under observation. With straight wedge lighting, it is necessary to locate the light source at the widest portion of the rim of the wedge. Unrefracted light also concentrates in the thin portion of the straight wedge and may result in a non-uniform brightness or light intensity pattern that increases in extent with respect to the member as the distance from the light source increases. Also, this type of light results in shadows on rounded parts of the member because of its unidirectional characteristics with respect to the member.

The shape of the modified wedge provides a peripheral edge or rim of substantially uniform width that is readily mounted in the casing of the instrument. Light may be introduced to the improved light conducting element at any portion of the edge. Also, as the width of the edge is less than the widest rim portion of the straight wedge, the required dimension between the display and the bezel of the casing of the instrument is decreased in size. The reverse wedge portion of the improved prism refracts light on the reading member to obviate light concentration therein and provide a more uniform light intensity pattern for the display that eliminates shadows.

In a plane through the improved prism and a light source, the portion of the prism of diminishing width nearest the source provides a modified primary type of wedge lighting and the portion of the prism of increasing width furthest from the source provides a reverse wedge type of illumination. The change in the type of illumination provided occurs at the thinnest portion of plano-concave prism.

Figure 2:
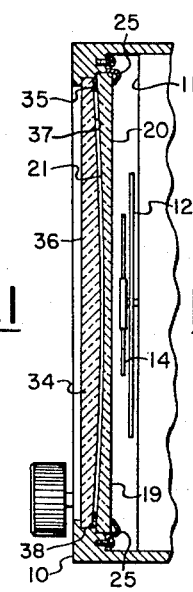
Figure 3:
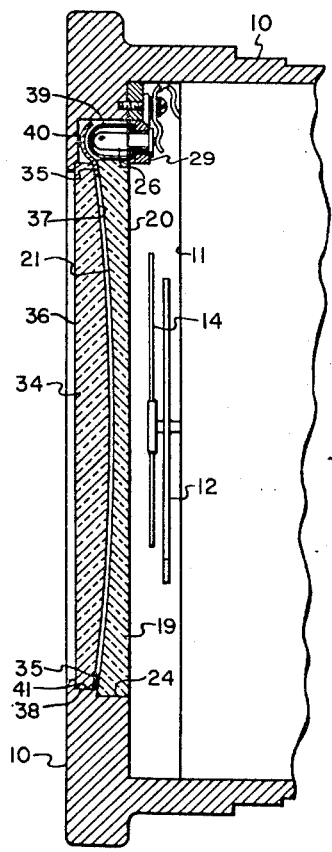
Figure 4:
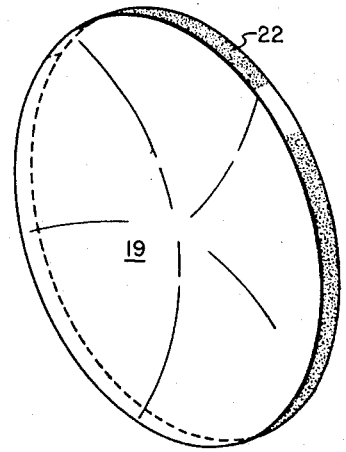
Figure 5:
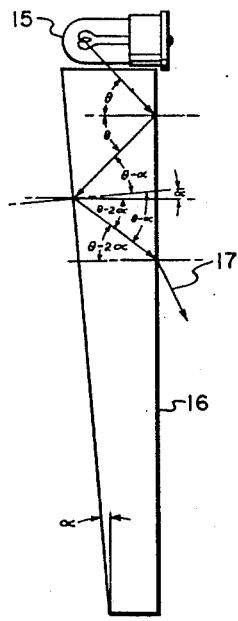
Figure 5:
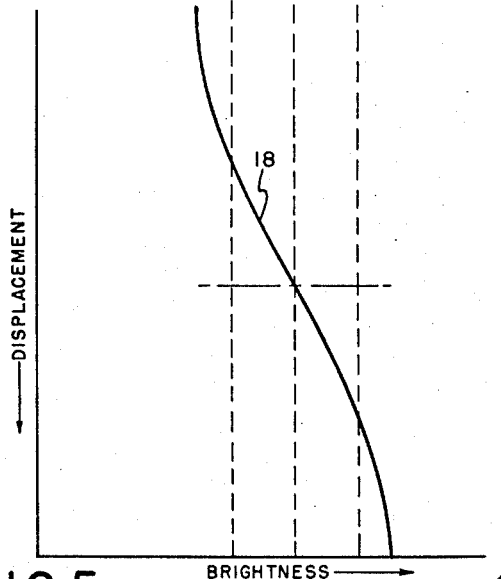
Figure 6:
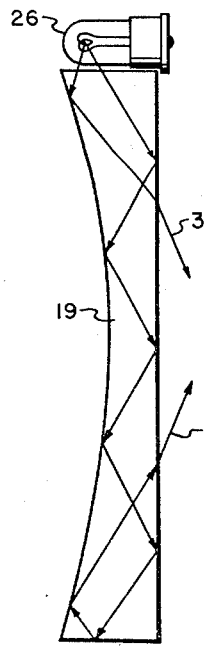
Figure 6:
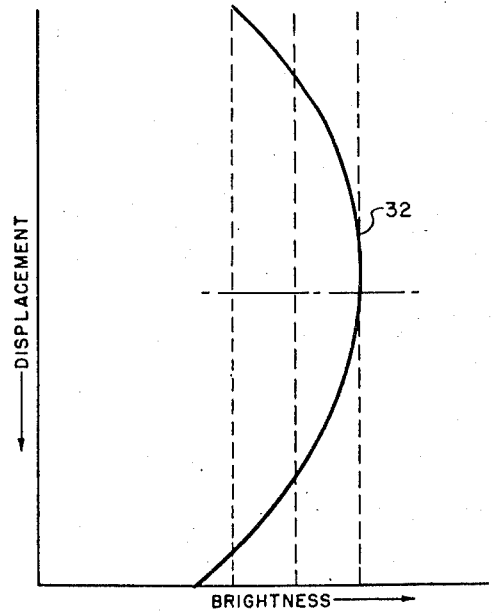

Other features and structural details of the present invention will appear from the following description of the preferred embodiment of the direct reading instrument illustrated in the accompanying drawings, in which FIG. 1 is a front view of a direct reading instrument embodying the present invention showing the same as it would appear on the instrument panel of an aircraft to the pilot of the craft, the view being partly broken away to show the cavity provided in the housing for one of the light sources, FIG. 2 is a sectional view taken on line 2—2, in FIG. 1, FIG. 3 is an enlarged sectional view taken on line 3—3, in FIG. 2, FIG. 4 is a perspective view of the improved plano-concave prism removed from the casing of the instrument, FIG. 5 is a schematic view illustrative of the theory of straight wedge lighting with a related curve showing concentration of unrefracted light in the lower portion of the prism, and FIG. 6 is a view similar in character to FIG. 5 illustrative of the modified primary and reverse type of wedge lighting provided by the improved plano-concave light conducting element or prism.

The illustrative instrument shown in FIGS. 1, 2 and 3 is a side reading compass with a casing 10 that is mounted on the instrument panel of an aircraft for observation by the pilot. The compass components represented include a vertical compass card 11, FIGS. 2 and 3, mounted in a fixed condition within the casing 10 having the conventional azimuth scale. The card constitutes the indicating face of the instrument. The movable member of the compass is provided by the pointer 12 which is read by the pilot with respect to the card 11 in determining the heading of the craft. In the relation of the compass components shown in FIG. 1, the instrument shows the pilot that the heading of the craft is 300 degrees. The instrument may also include a conventional settable heading pointer 14 also readable on the card 11. As shown, the pointer 14 has been set by the pilot to the new heading 210 degrees to which heading the craft is to be yawed. After the maneuver is completed, the pointer or needle 12 assumes an aligned position beneath the setting pointer 14. In the noted instrument, the pointer member 12 is generally flat and the settable pointer 14 is usually rounded.

Straight wedge types of illumination as taught by the patent to Lazo for such a reading instrument obtain light from a source 15 as indicated in FIG. 5 which is located at the widest portion of the wedge 16. The path of a typical light ray within the wedge 16 is shown in FIG. 5 as it is internally reflected down the wedge and finally escapes. In order for a ray to escape from the wedge, its final incident angle must be equal to or less than the critical angle $\theta_c$ of the light conducting material such as glass or plastic of which the wedge is formed. With a ray starting in the wedge at an initial incident angle $\theta$ greater than the critical angle of the material, it is reflected by one or the other of the straight wedge surfaces. Each time the ray is reflected by one or the other of its surfaces, its direction is changed by the angle of the wedge. The incident angle is accordingly decreased until it is equal to or less than the critical angle and the ray escapes. All escaping rays have a unidirectional characteristic with respect to the reading member or card 11 as indicated by the ray 17 in FIG. 5. Because of this characteristic, the light refracted from the wedge prism 16 results in a shadow on the lower rounded parts of the pointer 14. The unrefracted light also concentrates in the lower portion of the wedge prism so that the light intensity pattern of the straight wedge type of illumination is non-uniform, its brightness increasing with displacement or distance from the source 15 as shown by the curve 18 of FIG. 5.

The type of lighting provided for the indicating face or card 11 in accordance with the teaching of the present invention is a combined modified primary and reverse type of illumination. As shown in FIGS. 2, 3 and 4, the improved illuminating means includes a transparent light conducting element or circular prism 19 having a plane surface 20, a spherically curved concave surface 21 and a peripheral edge 22 of uniform width. The prism 19 may be of any material having light conducting properties such as glass or polished plastic. Element 19 may be suitably mounted in the casing 10 of the instrument with the plane surface 20 thereof in juxtaposed spaced relation to the card 11 and the respective pointers 12 and 14. As shown, this mounting is provided by an internal flange 24 in the bezel formed open front of the casing 10 in which the edge 22 of the prism fits. Spring type clamps such as indicated at 25 in FIG. 2 may be included in the casing 10 to hold the prism 19 in position in the flange 24.

The light source required for illumination with the improved prism is provided by a pair of electrical light bulbs one of which is indicated at 26 in FIG. 3. As shown in FIG. 1, the casing 10 is provided with two internal cavities or wells 27, 28, in which respective bulbs with suitable slotted shields as indicated by reference numeral 39 in FIGS. 1 and 3 are adapted to fit so as to direct light into the edge of the prism. The bulbs are mounted in suitable sockets as indicated at 29 that are secured within the casing and may be energized from a conventional electrical energy source. To reflect light, the edge of the prism 19 may be painted white except at the points thereof that are juxtaposed to the respective light sources. As the edge of the improved prism is of uniform width, light may be introduced into the prism at any point or points in its periphery.

With relation to FIG. 6, in a plane through the improved prism 19 and a light source 26, the modified wedge refracts light therefrom in the primary wedge portion of the prism of diminishing width with regard to the source 26. In this portion of the prism, the face is illuminated in the primary type of wedge lighting with the rays directed as indicated at 30. The portion of the prism furthest from the source 26 provides a reverse wedge type of illumination in which the light enters at the thinnest portion of the plano-concave prism and is reflected internally within the prism off the edge surface to refract from the prism in the direction indicated by the ray 31. The reverse wedge illumination relieves the light concentration at the thin portion of the straight wedge as indicated by the curve 32 in FIG. 6 so that the brightness at a distance from the light source is substantially the same as it is close to the light source. The refracted light rays 31 directed oppositely to the rays 30 illuminate the under surfaces of the curved pointer member 14 and obviate shadows in this area thereof. The primary wedge lighting is modified due to the fact that the concave surface of the prism is curved radially rather than straight. The type of illumination changes from modified primary wedge type lighting to reverse wedge type lighting at the thinnest portion of the plano-concave prism. The spherically curved surface of the prism 19 is preferably spherical.

The improved prism 19 is preferably arranged in the casing 10 with the plane surface 20 thereof juxtaposed to the face or card member 11 and the pointers 12, 14. The instrument shown in FIG. 3 includes a corrective lens 34 having the reverse characteristics of the illuminating prism 19. As shown in FIGS. 2 and 4, the lens 34 includes a plane surface 36, a spherically curved convex surface 36 conforming to the spherically curved concave surface of the illuminating prism 19 and a peripheral edge 38 of uniform width. Lens 34 is mounted on the instrument with its convex surface 37 arranged in juxtaposition to the concave surface of the illuminating prism 19 and its plane surface 36 in spaced parallel relation to the plane surface of the illuminating prism. Lens 34 is mounted in the bezel opening end of the casing 10 in front of the prism 19 being spaced from the prism by a flexible ring spacer 35 that includes tab portions 40 that extend into the light wells 27, 28. The ring spacer 35 shields the outer curved surface of the prism 19 from the light source 26. The tab portions 40 extending radially from the ring 35 fit into the wells 27 and 28 to further shield the corrective lens 34 from the sources of light. In the arrangement provided, the clamps 25 also hold the lens 34 in a flange 41 in the casing in which the rim of the lens fits. Light refracted by the prism 19 illuminates the compass components so that the pointers appear in front of the card 11 without any shadow portions as viewed by the pilot through the lens 34 and prism 19. There is also no visible concentration of light in the lower portion of the illuminating prism.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. Apparatus for illuminating an instrument dial, comprising a thin prism of transparent material bounded by front and rear surfaces and a peripheral edge portion of substantially uniform thickness, the rear surface being planar and the front surface being spherically curved in concave fashion throughout the entire front surface, and a light source adjacent a portion of said edge and exposed thereto to supply light to the interior of said prism.

2. The apparatus claimed in claim 1, further including a corrective lens having a spherically curved convex surface conformal to and adjacent the concave surface of said prism, and a plane surface parallel to the plane surface of said prism.

References Cited in the file of this patent

UNITED STATES PATENTS

| | | |
|---|---|---|
| 2,251,984 | Cleaver | Aug. 12, 1941 |
| 2,761,056 | Lazo | Aug. 28, 1956 |

FOREIGN PATENTS

| | | |
|---|---|---|
| 525,515 | Belgium | Jan. 30, 1954 |